Sept. 14, 1937.  F. MAIER  2,092,849
DOUGHNUT COOKING MACHINE
Filed June 2, 1936  2 Sheets-Sheet 1

INVENTOR
Frederick Maier,
BY
Beau, Brooks, Buckley & Beau.
ATTORNEYS

Sept. 14, 1937.  F. MAIER  2,092,849
DOUGHNUT COOKING MACHINE
Filed June 2, 1936   2 Sheets-Sheet 2

INVENTOR
Frederick Maier,
BY
Bean, Brooks, Buckley & Bean.
ATTORNEYS

Patented Sept. 14, 1937

2,092,849

UNITED STATES PATENT OFFICE 2,092,849

DOUGHNUT COOKING MACHINE

Frederick Maier, Buffalo, N. Y.

Application June 2, 1936, Serial No. 83,150

12 Claims. (Cl. 53—7)

This invention relates to a machine for cooking or frying doughnuts and the like, and it has for its object to provide a machine or apparatus of this nature which may be manually operated and made to handle large quantities of the fried product in an expeditious manner so that a maximum output may be obtained with the least expenditure of time and effort.

Machines have heretofore been designed for frying doughnuts, the latter term being used in an inclusive sense with respect to fried cakes and other foods which are cooked in a bath of grease, but their designs have been objectionable for several reasons, primarily because they have lacked a practical construction by which the doughnuts could be handled on a large scale expeditiously. In the larger bakery establishments automatic machinery has been used, but because of the expense, such has been impractical for adoption by the smaller bakery.

The present invention comprehends a simple doughnut cooking machine which is of simple and practical design by which the removal of the doughnuts from the frying bath is facilitated, thereby enabling the handling of large quantities of the product by manual effort and with the least expenditure of energy. The invention further embodies means by which the frying of the doughnuts is conducted throughout a substantially even temperature to thereby insure uniformity in the fried product.

In the drawings

Fig. 3 is a fragmentary front elevation of the machine.

Figure 1:
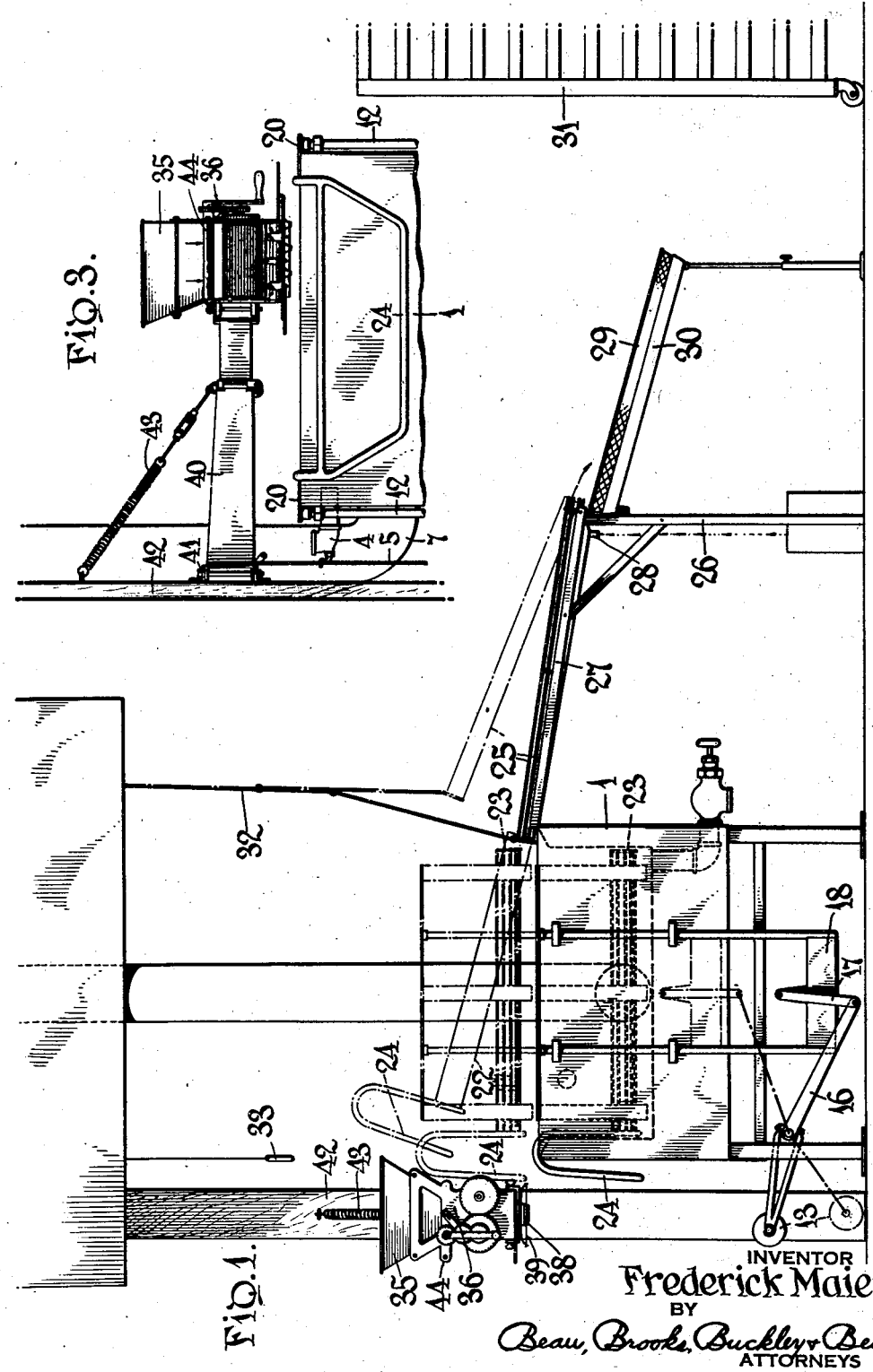
Fig. 1 is a side elevation of a doughnut cooking machine constructed in accordance with the present invention and showing one embodiment thereof.

Referring more particularly to the drawings, the numeral 1 designates a tank or vat for containing the frying bath, the latter being heated and maintained at the desired cooking temperature by a gas burner 2 underlying the tank. The burner is regulated by a valve 3 which is regulated by means of a thermostat 4, being connected thereto by a link 5. The thermostat may also regulate a damper 6 in the heat flue 7 whereby the desired nicety in the control of the temperature of the frying bath is obtained.

To conserve the heat, the tank 1 is enclosed within a case or wall 8, of asbestos or other heat insulating material, and is spaced from the tank so as to provide a heating chamber 9 immediately about the tank. This insures rapid heating of the frying bath and easy maintenance of the desired temperature thereof. The flue 7 opens into the heating space or chamber 9 at a level below the upper portion of such chamber so as to confine the heat for a longer interval about the tank. A bottom heat insulating panel 10 is mounted beneath the burner 2 to thereby conserve the heat and keep down the temperature of the room in which the operator is working. The wall 8 stops short of this panel to provide an open air gap 8' below the burner. The upper edge of the tank is beveled downwardly into the tank to better return the grease thereinto.

A carrying frame 11 is supported at opposite sides of the tank by vertically guided pairs of rods 12 for being lowered into and raised from the frying bath. The rods 12 are vertically moved by means of a pedal 13 which is pivotally mounted on the frame supporting structure 14 of the machine by means of the transverse shaft 15. The shaft is provided with terminal crank arms 16 which are connected by links 17 to the cross bars 18 of the respective pairs of rods 12 at the opposite sides of the tank. By depressing the pedal 13 the operator will elevate the frame 11 from the frying bath, as indicated by the broken line showing in Figs. 1 and 2. Releasing the pedal will permit the frame to lower by gravity into the bath.

The carrying frame is substantially U-shaped in cross section to form a cradle, to receive a basket 21, and has the outturned flanges 20 by which the frame is secured to the upper ends of the rods 12. This basket may comprise a series of parallel wires 22 adapted to rest directly on the transverse bars 19 embodied in the fabrication of the cradle frame 11. The wires are united by the cross frame members 23 of the basket frame, and one of such braces is continued and turned outwardly and downwardly to provide a handle 24 which overhangs and receives the upper edge of the tank when the basket is in doughnut frying position, as shown by solid lines in Fig. 1. This serves to hold the basket against abnormal shifting in the frame. The wires 22 may be multiplied to define side walls for the basket, and they will preferably extend to the rear edge of the basket so as to facilitate the discharge of the fried doughnuts from the basket when the latter is tilted.

Figure 2:
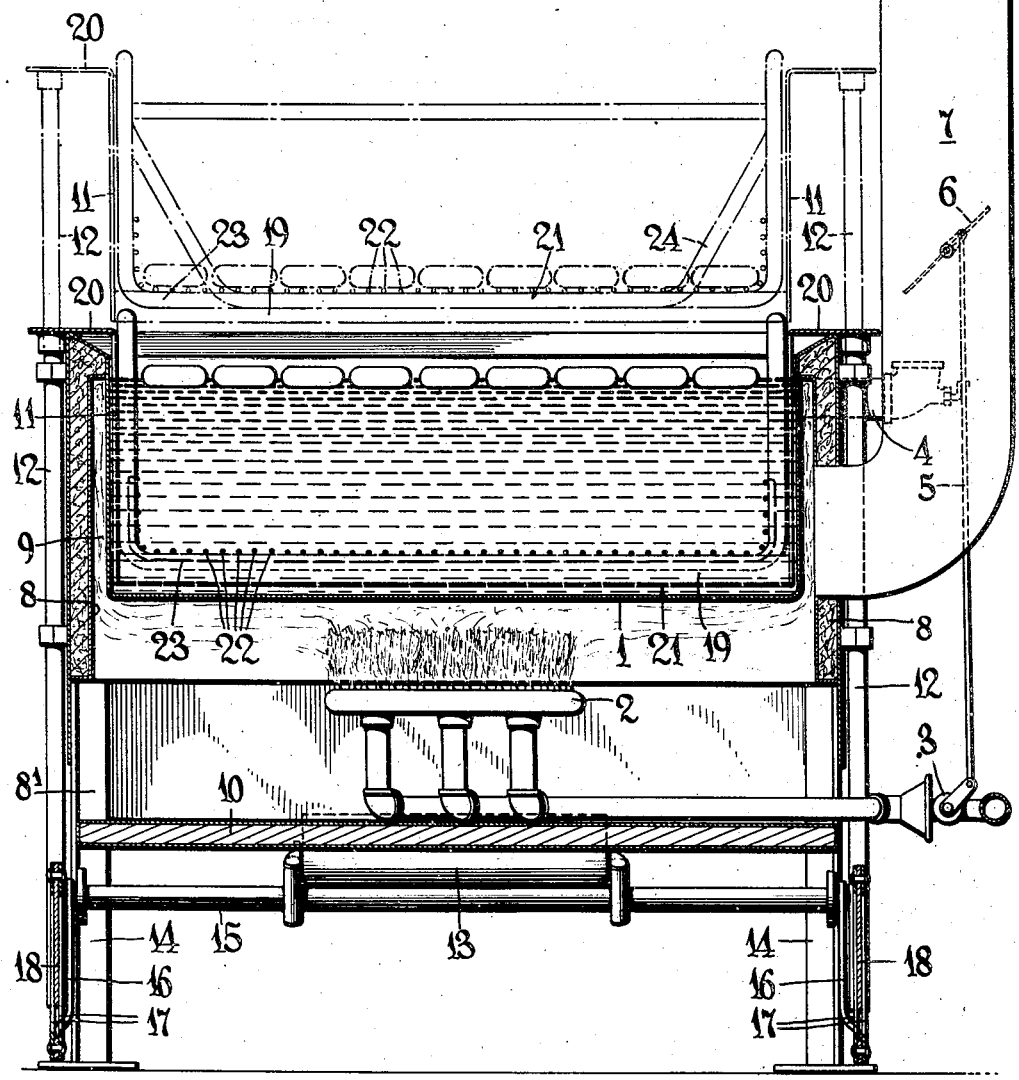
Fig. 2 is a transverse sectional view through the frying bath.

The basket is tiltably mounted, and when elevated from the frying bath is adapted to be tilted on the cradle to an inclined position, such as is indicated in Fig. 1. The inclination permitted is sufficient to cause the fried doughnuts to gravitate off the lower end of the basket on to a tiltable draining tray 25. This tray has one edge supported adjacent the side of the tank and its opposite edge pivotally mounted on an outwardly spaced support 26. An overhead cable 32 is connected to the tray as a means for tilting the same, the cable being extended over to a location accessible to the operator and provided with a handle 33. Thus, from his station the operator may operate his pedal 13, the handle 24 and the handle 33. The doughnuts are permitted to rest upon the draining tray 25 until the excess grease or fat has drained therefrom on to an underlying drip pan 27 from which the grease may be recovered through a spout 28.

After the doughnuts have drained sufficiently, the tray 25 is tilted by pulling on the cable 32 to discharge the doughnuts on to a storage tray 29, which is removably mounted on a shelf 30. When the storage tray is full it is removed to a rack 31 by which the doughnuts may be carried into the packing room for further treatment.

The raw doughnuts are formed from a batch of dough disposed in a hopper 35 of a forming and depositing apparatus 36. This apparatus forms the subject matter of a co-pending application, and, therefore, detailed description will not be necessary, suffice it to say that the dough is fed downwardly through extruding nozzles 38 from which the shaped doughnuts are severed by cutting wires 39. Several nozzles are provided so as to increase the output of the doughnut former, which latter is given flexible support by an extensible arm 40 which is loosely pivoted at 41 to an upright 42 for horizontal movement over the frying bath and vertical movement, whereby the nozzles may be lowered close to the bath. Normally the arm is held elevated by a spring 43. The operator may, therefore, grasp the handle 44 and manipulate the hopper over the frying bath and, in rapid succession, effect a deposit of a series of rows of the raw doughnuts, shifting the forming apparatus back and forth to effect equal distribution of the doughnuts in the bath. By this operation the operator is enabled to quickly fill the tank to its capacity and secure a uniform frying of the entire batch.

While the foregoing description has been given in detail, it is not the intention thereby to limit the invention which is obviously capable of embodiment in other physical forms without departing from the inventive concept.

What is claimed is:

1. A doughnut frying machine comprising a tank for containing a frying bath, means beneath the tank for heating the bath, a heat insulating wall encasing the sides of the tank and spaced therefrom to provide a heat circulating and retaining space, a carrying frame supported by the tank for vertical movement into and out of the frying bath, means for vertically moving the frame to a doughnut discharging position and then coming to rest thereat, and a doughnut basket tiltably mounted in the frame for movement therewith and manually tiltable from such rest position for discharging the cooked doughnuts.

2. A doughnut frying machine comprising a tank for containing a frying bath, means for heating the bath, a carrying frame supported by the tank for vertical movement into and out of the frying bath, means for vertically moving the frame, a doughnut basket tiltably mounted in the frame for movement therewith and adapted to be tilted to an inclined position for sliding the cooked doughnuts off the rear side thereof, said basket having a handle connected to the front side of the basket to effect such tilting movement, and a drain tray disposed at the rear side of the basket for receiving the fried doughnuts discharged therefrom.

3. A doughnut frying machine comprising a tank for containing a frying bath, means for heating the bath, a carrying frame supported by the tank for vertical movement into and out of the frying bath, means for vertically moving the frame, a doughnut basket tiltably mounted in the frame for movement therewith and adapted to be tilted in its upper position for discharging the cooked doughnuts, said basket having a handle to effect such tilting movement, a drain tray disposed for receiving the fried doughnuts discharged from the basket, means mounting said drain tray for being tilted to discharge the drained doughnuts therefrom, and means extending to a position in proximity to said handle for tilting such drain tray.

4. A doughnut cooking machine comprising a tank for containing a frying bath, means for maintaining the bath at a frying temperature, a carrying frame supported for vertical movement into and out of the bath, and a doughnut basket cradled in the frame and mounted for independent tilting movement to an inclined position to effect a sliding discharge of the fried doughnuts off the edge of the basket.

5. A doughnut cooking machine comprising a tank for containing a frying bath, means for maintaining the bath at a frying temperature, a carrying frame supported for movement into and out of the bath, and a doughnut basket cradled in the frame and mounted for independent tilting movement to effect a discharge of the fried doughnuts, said basket having a handle folded over the upper edge of the tank so as to receive such edge of the tank during the lowering movement of the frame into the bath.

6. A doughnut cooking machine comprising a tank for containing a frying bath, means for maintaining the bath at a frying temperature, a carrying frame supported for vertical movement into and out of the bath, a doughnut basket cradled in the frame and mounted for independent tilting movement to effect a discharge of the fried doughnuts, said basket having a handle folded over the upper edge of the tank so as to receive such edge of the tank during the lowering movement of the frame into the bath, and means underlying the handle for vertically moving the frame.

7. A doughnut cooking machine comprising a tank for containing a frying bath, means for maintaining the bath at a frying temperature, a carrying frame supported for movement into and out of the bath, a doughnut basket mounted in the frame for relative movement to an inclined position to effect a sliding discharge of the fried doughnuts therefrom, and a drain tray for receiving the doughnuts and being mounted for movement to an inclined position to further a sliding discharge of the doughnuts whereby the latter are retained in order during their removal from the bath.

8. A doughnut cooking machine comprising a tank for containing a frying bath, means for maintaining the bath at a frying temperature, a carrying frame supported for vertical movement into and out of the bath, a doughnut basket disposed in the frame, said basket being tiltable to discharge the doughnuts from one side thereof, a drain tray tiltably mounted at such side of the basket to receive and discharge the doughnuts, and means accessible from a common station for vertically moving the frame for tilting the basket and also tilting the drain tray.

9. A doughnut frying machine comprising a tank containing a frying bath with means for maintaining the frying temperature of the bath, means movable from the tank for lifting the fried doughnuts from the bath, means movable to and from a position over the bath for extruding raw doughnuts and discharging them into the basket, and means supporting said extruding means for movement down in proximity to the bath to avoid splashing of the hot grease.

10. A doughnut frying machine comprising a tank containing a frying bath with means for maintaining the frying temperature of the bath, means movable from the tank for lifting the fried doughnuts from the bath, means movable to and from a position over the bath for extruding raw doughnuts and discharging them into the basket, and resilient means supporting said extruding means to permit movement of the latter down in proximity to the bath.

11. A doughnut cooking machine comprising a tank for containing a frying bath, means for maintaining the bath at a frying temperature, a carrying frame supported for vertical movement into and out of the bath, a doughnut basket cradled in the frame and mounted for independent tilting movement to effect a discharge of the fried doughnuts, said basket having a handle extending over the upper edge of the tank so as to receive such edge of the tank during the lowering movement of the frame into the bath, means underlying the handle for vertically moving the frame, a drain tray for receiving the doughnuts from the basket, means mounting the drain tray for movement to an inclined doughnut discharging position, and means adjacent said handle for moving said drain tray to such inclined position.

12. A doughnut frying machine comprising a tank containing a frying bath with means for maintaining the frying temperature of the bath, means mounted over the bath for extruding raw doughnuts and discharging them into the basket, and means resiliently supporting said extruding means for movement down in proximity to the bath to avoid splashing of the hot grease.

FREDERICK MAIER.